United States Patent
Schwerman et al.

(10) Patent No.: US 12,431,927 B2
(45) Date of Patent: Sep. 30, 2025

(54) APPARATUS AND METHOD FOR REDUCING NOISE IN A SYSTEM USING SINGLE ENDED SIGNAL TRANSMISSION

(71) Applicant: Honeywell International Inc., Charlotte, NC (US)

(72) Inventors: Paul W. Schwerman, Phoenix, AZ (US); Gregory W. Keith, Glendale, AZ (US)

(73) Assignee: Honeywell International Inc., Charlotte, NC (US)

( * ) Notice: Subject to any disclaimer, the term of this patent is extended or adjusted under 35 U.S.C. 154(b) by 54 days.

(21) Appl. No.: 18/586,188

(22) Filed: Feb. 23, 2024

(65) Prior Publication Data

US 2025/0274153 A1 Aug. 28, 2025

(51) Int. Cl.
  *H04B 1/12* (2006.01)
  *H04B 15/00* (2006.01)

(52) U.S. Cl.
  CPC ........... *H04B 1/123* (2013.01); *H04B 15/005* (2013.01)

(58) Field of Classification Search
  CPC .................................................... H04B 15/005
  See application file for complete search history.

(56) References Cited

U.S. PATENT DOCUMENTS

| | | | |
|---|---|---|---|
| 4,542,349 A | 9/1985 | Hoeft | |
| 4,755,770 A | 7/1988 | Groom et al. | |
| 9,538,634 B2 * | 1/2017 | Yamaguchi | H05K 1/0245 |
| 9,564,879 B1 * | 2/2017 | Luo | G11C 29/022 |
| 2011/0128170 A1 * | 6/2011 | Bae | H04L 25/03866 341/95 |
| 2012/0200159 A1 * | 8/2012 | Katagiri | G11C 7/02 307/43 |

FOREIGN PATENT DOCUMENTS

CN 102651633 B 9/2014

OTHER PUBLICATIONS

Slovick, Murray, "Space-Saving Active EMI Filters Mitigate Common-Mode Emissions", Electronic Design, May 2023, pp. 1 through 9.
(Continued)

*Primary Examiner* — Dac V Ha
(74) *Attorney, Agent, or Firm* — Fogg & Powers LLC

(57) ABSTRACT

Techniques are provided which reduce common mode noise voltage in single ended signal transmission. The common mode noise voltage is generated by a noise generating current flowing through an inductance of a return path between a transmitting circuit and a receiving circuit. The common mode noise voltage may be diminished by generating a noise cancelling current which flows through the inductance in the return path in a direction opposite to the flow of the noise generating current. As a result, a magnitude of noise current flowing through the inductance is diminished. Further the transmitting circuit and receiving circuit are isolated, by using buffering, from ground plane(s) of the transmitting and/or the receiving circuits so that such circuits are substantially unaffected by this common mode noise suppression technique.

20 Claims, 5 Drawing Sheets

(56) References Cited

OTHER PUBLICATIONS

Srisawang et al., "Common-Mode Current Cancellation Scheme of Half-Bridge Switch-Mode Converter for DC Motor Drive", (2003), as downloaded Nov. 13, 2023 from https://koreascience.kr/article/CFKO200333239337227.pdf, pp. 1876 through 1879.

Texas Instruments, "TPSF12C1-Q1 Standalone, Active, EMI Filter for Common-mode Noise Mitigation in Single-Phase, AC, Automotive Power Systems", SNVSCB7A, Nov. 2022, Revised Apr. 2023, pp. Cover through 32.

* cited by examiner

APPARATUS AND METHOD FOR REDUCING NOISE IN A SYSTEM USING SINGLE ENDED SIGNAL TRANSMISSION

BACKGROUND

Common mode noise may be generated by single ended signal transmission and this noise when present often manifests itself as voltage differences in a ground structure. This common mode noise can reduce the signal to noise ratio at a receiver operating on one of the ground structures attached to a bus conveying the single ended signal transmissions. The common mode noise may also cause errors when detecting the received single ended transmissions between two ground structures.

Common mode noise is typically redressed by using differential signaling instead of single ended signaling. Differential signaling, however, requires two electrical conductors for each signal path. Thus, each electronic circuit configured to transmit and/or receive using differential signaling must include two electrical contacts, e.g., electrically conductive pins, for each signal path. As a result, a system using differential signaling has undesirably increased cost and/or size which may be unacceptable for some applications.

SUMMARY

In some aspects, the techniques described herein relate to a system for reducing a common noise voltage when receiving N single ended signals, the system including: a first noise cancellation circuit whose ground reference is configured to be (a) a ground plane of a receiving circuit including N receiving circuit input impedances each of which is configured to receive one of the N single ended signals or (b) a ground plane of a transmitting circuit configured to transmit the N single ended signals, wherein N is an integer greater than zero; and wherein the first noise cancellation circuit includes N first compensation impedances each of which has a first port and a second port, wherein each second port is configured to be electrically connected to the ground plane of the receiving circuit or the transmitting circuit; wherein the first noise cancellation circuit further includes a first impedance buffer circuit including (i) N first buffer inputs and (ii) N first buffer outputs each of which is electrically connected to the first port of one of the N first compensation impedances; wherein each first compensation impedance is configured to generate a first noise cancellation sub-current when a voltage of a single ended signal, received by a corresponding first buffer input, varies; wherein the first noise cancellation circuit is further configured to generate a first noise cancelling current which is a sum of first noise cancellation sub-currents and which flows through an inductance in a return path, between the transmitting circuit and the receiving circuit, in a direction opposite to a flow through the inductance of a noise generating current which flows through the return path from the receiving circuit to the transmitting circuit and which is formed by a sum of first noise generating sub-currents each of which is configured to be generated in one of the N receiving circuit input impedances when a voltage of a single ended signal received there at changes.

In some aspects, the techniques described herein relate to a method for reducing a common noise voltage when receiving at least one single ended signal, the method including: receiving, at a receiving circuit whose ground reference is a ground plane of the receiving circuit, one or more single ended signals whose voltage level changes, from a transmitting circuit whose ground reference is a ground plane of the transmitting circuit; in response to receiving the one or more single ended signals whose voltage level changes, generating a noise generating current flowing from the receiving circuit to the transmitting circuit through an inductance in a return path from the receiving circuit to the transmitting circuit; and using the one or more single ended signals whose voltage level changes, generating a first noise cancelling current flowing through the inductance in the return path in a direction opposite to a flow of the noise generating current through the inductance.

In some aspects, the techniques described herein relate to an apparatus for reducing common mode noise in single ended digital data, the apparatus including: an inverter circuit configured to receive N single ended signals transmitted to N input impedances of receiving circuitry, wherein N is an integer greater than zero; and N compensation impedances, wherein a first port of each of the N compensation impedances is electrically coupled to a unique output port of the inverter circuit, and wherein a second port of each of the N compensation impedances is electrically connected to all other second ports of other compensation impedances and to a first or a second ground plane; wherein the inverter circuit is configured to invert a single ended signal received at each input port of the inverter circuit to provide each single ended signal which has been inverted to a unique compensation impedance of the N compensation impedances; wherein in response to receiving each single ended signal which has been inverted, the N compensation impedances are configured to generate a noise cancelling current which is summed with a noise generating current, generated in the N input impedances of the receiving circuitry, to form a sum current which flows through an inductance in a return path electrically coupling the first and the second ground planes and whose magnitude is less than a magnitude of the noise generating current.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1:
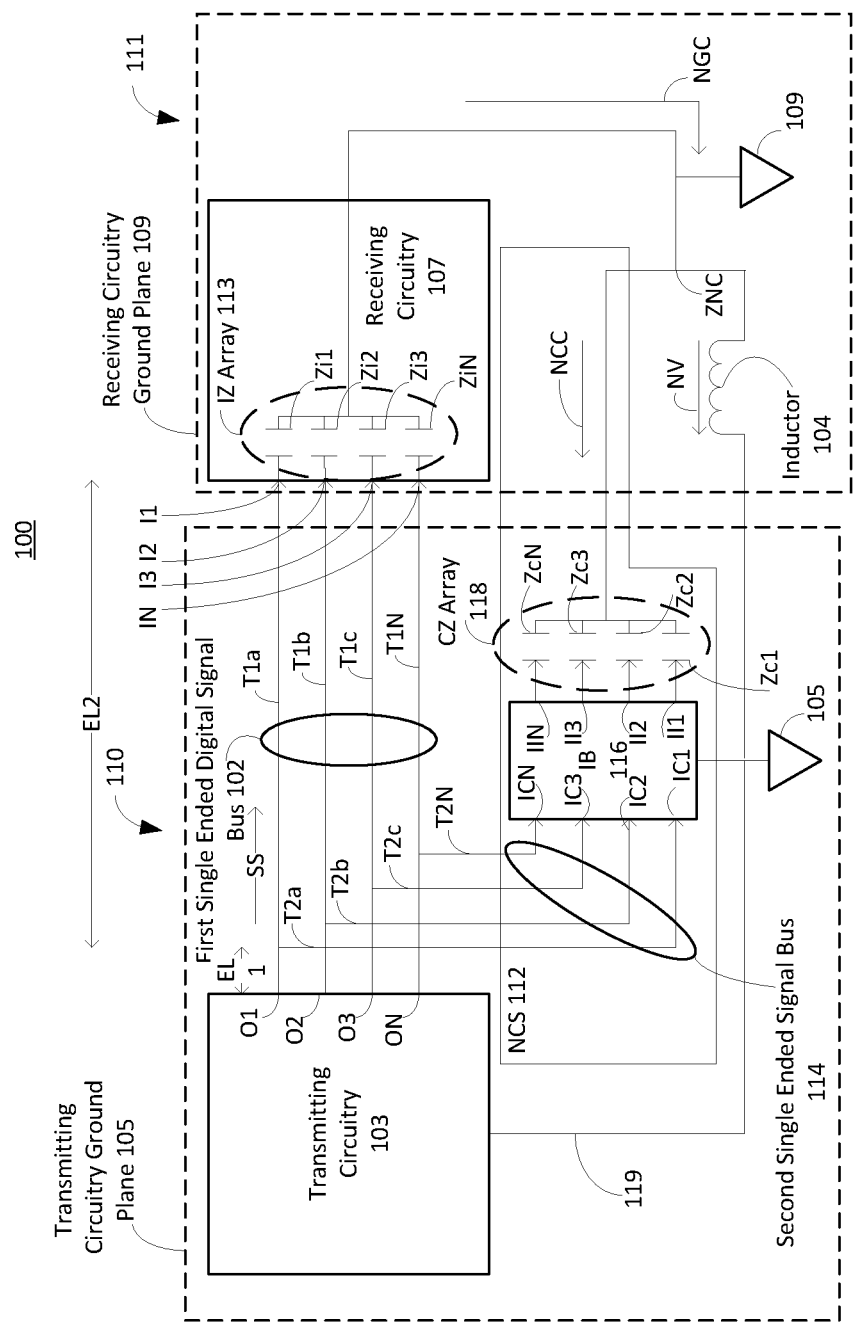
FIG. 1 illustrates a schematic diagram of one embodiment of a system, for reducing a common noise voltage when receiving at least one single ended signal, using a noise cancelling system whose ground is referenced with respect to a transmitting circuitry ground plane.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, each method presented in the drawing figures and the specification is not to be construed as limiting the order in which the individual steps may be performed. The following detailed description is not to be taken in a limiting sense.

Embodiments of the invention reduce common mode noise in single ended signal transmission. As a result, system cost and/or size may be reduced. Embodiments of the invention have the benefits of differential signaling with the addition of only one electrical contact, e.g., one electrically conductive pin, in a signal path independent of the number of signals crossing a ground structure including two ground structures. Embodiments of the invention reduce the common mode noise between ground structures without lowering isolation between the ground structures. For pedagogical purposes, a ground structure may be referred to herein as a ground plane.

Common mode noise in receiving circuitry which receives single ended signal(s) may be created as follows. A noise generating current is created in input impedance(s), of the receiving circuitry, configured to receive such signal(s) at a first port of the input impedance(s). The noise generating current is an undesired current which generates a detrimental noise voltage in an inductance in a return path in which such noise generating current flows from the receiving circuitry to transmitting circuitry which transmitted the single ended signal(s). Optionally, the return path includes the ground planes of the receiving and the transmitting circuitry. The noise generating current is converted to the common mode noise in the inductance in the return path electrically coupling the receiving and transmitting circuitry.

Embodiments of the invention diminish the common mode noise by generating a noise cancelling current. The noise cancelling current flows through the inductance in an opposite direction of, and is thus used to suppress, the generated noise current (or noise generating current). A magnitude of a sum of the noise generating current and the noise cancelling current is less than a magnitude of the noise generating current. As a result, a magnitude of the common noise voltage, generated in the inductance in the return path by the sum of such currents, is diminished. By using buffering to affect the reduction in common mode noise voltage in the return path, input impedances of the receiving circuitry and output impedances of the transmitting circuitry are substantially unaffected.

For pedagogical purposes, the signal(s) giving rise to the noise generating current may be illustrated herein as digital data signal(s). However, embodiments of the invention may also be used when the signal(s) are analog signal(s) or mixed analog and digital signals.

FIG. 1 illustrates a schematic diagram of one embodiment of a system 100, for reducing a common noise voltage when receiving at least one single ended signal, using a noise cancelling system whose ground is referenced with respect to a transmitting circuitry ground plane. The system 100 includes a transmitting system 110 electrically coupled through a first single ended signal bus 102, e.g., a single ended digital data bus, to a receiving system 111.

The first single ended signal bus 102 comprises N first transmission lines T1$a$, T1$b$, T1$c$, T1N. N is an integer greater than zero. Each first transmission line is configured to propagate a unique signal, e.g., a unique digital signal. Optionally, the N first transmission lines T1$a$, T1$b$, T1$c$, T1N are configured to propagate N bits of data, e.g., in parallel if N is greater than one; each first transmission line is configured to convey a single bit at a time. For pedagogical purposes, the first single ended signal bus 102 is illustrated as having four first transmission lines T1$a$, T1$b$, T1$c$, T1N which may be configured to propagate 4 bits of data in parallel.

The transmitting system 110 includes transmitting circuitry 103 electrically coupled to, and whose ground is referenced with respect to, a transmitting circuitry ground plane 105. The transmitting system 110 also includes a noise cancellation system 112. The transmitting circuitry 103 includes N transmitting circuitry output ports O1, O2, O3, ON. The receiving system 111 includes receiving circuitry 107 electrically coupled to, and whose ground is referenced with respect to, a receiving circuitry ground plane 109.

A return path 119, including the inductor 104 across which the common mode noise voltage NV is generated, electrically couples the receiving circuitry 107 to the transmitting circuitry 103. Optionally, the return path 119 includes the receiving circuitry ground plane 109 and the transmitting circuitry ground plane 105. For pedagogical purposes, FIG. 1 illustrates the inductance as an inductor 104, e.g., which optionally is used to suppress low frequency noise in the receiving circuitry 107. The inductance, however, may be a formed by one or more inductances in the return path 119 through which the noise generating current flows; each such inductance may arises in a transmission line, a wire coil, and/or any other type of electrical component or structure having an inductance.

Although the inductance, e.g., the inductor 104, is illustrated as being part of the receiving circuitry ground plane 109 for pedagogical purposes, the inductance may be part of the receiving circuitry ground plane 109, the transmitting circuitry ground plane 105 and/or an interconnect, between the transmitting circuitry ground plane 105 and the receiving circuitry ground plane 109, which is independent of either system. For pedagogical purposes, the inductance may be referred to herein as the inductor 104.

The receiving circuitry 107 includes N receiving circuitry input ports I1, I2, I3, IN, and an input impedance array (IZ array) 113. Each input port of the receiving circuitry 107 is electrically coupled through a unique first transmission line of the first single ended signal bus 102 to a unique output port of the transmitting circuitry 103.

The input impedance array 113 includes N input impedances Zi1, Zi2, Zi3, ZiN. Each of the input impedances Zi1, Zi2, Zi3, ZiN is an input impedance of a corresponding receiving circuitry input port I1, I2, I3, IN. Thus, each of the input impedances Zi1, Zi2, Zi3, ZiN is also electrically coupled to a unique first transmission line of the first single ended signal bus 102 and a unique output port of the transmitting circuitry 103. Each of the input impedances Zi1, Zi2, Zi3, ZiN has one node electrically connected to the receiving circuitry ground plane 109 and the inductor 104. Optionally, each input impedance arises from conductive trace(s), resistor(s), and/or transistor(s).

A change of voltage level at one or more of the receiving circuitry input ports I1, I2, I3, IN generates the noise generating current NGC, i.e., in the input impedances across which the change of voltage level occurs. For example, for digital data, such voltage level change(s) may arise due to a logic level change provided by the transmitting circuitry and propagating through one or more first transmission lines T1a, T1b, T1c, T1N of the first single ended signal bus 102. Optionally, a frequency of the noise generating current NGC can be at and/or below a clock frequency of transmitted signals, e.g., of the data in signals SS transmitted over first single ended signal bus 102. The noise generating current NGC is conveyed through the receiving circuitry ground plane and the inductor 104 to the transmitting circuitry ground plane 105. The noise generating current NGC flowing through the inductor 104 of the receiving system 111 generates an undesirable common mode noise voltage NV across the inductor 104. The value of the common mode noise voltage NV is obtained by multiplying a rate of change of the current, e.g., the noise generating current NGC, flowing through the inductor 104, by the inductance of the inductor 104. The common mode noise voltage NV diminishes the signal to noise ratio of signals SS, e.g., digital data, received from the transmitting circuitry 103 at the receiving circuitry 107. As a result, the receiving circuitry 107 may erroneously detect the value, e.g., the amplitude or logical level, of such signal(s) SS. Also, the common mode noise voltage NV on the transmitting circuitry ground plane 105 can diminish the signal to noise ratio of signals of the transmitting circuitry 103 which uses the transmitting circuitry ground plane 105 as a ground reference.

To diminish the common noise voltage and errors which it can cause, the system 100 also includes the noise cancellation system (or noise cancellation circuitry or NCS) 112. The noise cancellation system 112 includes an optional second single ended signal bus 114, an impedance buffer circuit (IB) 116, and a compensation impedance (CZ) array 118. A ground reference of the noise cancellation system 112 and the impedance buffer circuit 116 is the transmitting circuitry ground plane 105. When a ground of the noise cancelling system 112 is referenced with respect to the transmitting circuitry ground plane 105, then the impedance buffer circuit 116 is an inverting buffer circuit. The impedance buffer circuit 116 is configured to substantially isolate an input impedance connected to an input of the impedance buffer circuit 116 from an output impedance connected to a corresponding output of the impedance buffer circuit 116.

For pedagogical reasons the noise cancelling system is illustrated as being part of the transmitting system 110 or the receiving system 111. However, components of the noise cancellation system 112 may alternatively be located in the one or both of the transmitting system 110 or the receiving system 111. By consolidating all components of the noise cancelling system 112 into one of the transmitting system 110 or the receiving system 111, then only a single electrical connection need be made to connect the transmitting circuitry ground plane 105 to the receiving circuitry ground plane 109.

The optional second single ended signal bus 114 also comprises N second transmission lines T2a, T2b, T2c, T2N. Each second transmission line is configured to propagate a unique signal, e.g., a unique digital signal. Optionally, the N second transmission lines T2a, T2b, T2c, T2N are configured to propagate N bits of data, e.g., in parallel if N is greater than one; each second transmission line is configured to convey a single bit at a time. For pedagogical purposes, the optional second single ended signal bus 114 is illustrated as having four second transmission lines T2a, T2b, T2c, T2N which may be configured to propagate 4 bits of data in parallel.

The impedance buffer circuit 116 includes N impedance buffer input ports IC1, IC2, IC3, ICN and N impedance buffer output ports II1, II2, II3, IIN. Each inverter input port is uniquely electrically coupled to a unique transmission line of the first single ended signal bus 102 by a unique transmission line of the optional second single ended signal bus 114.

When an inverting impedance buffer circuit, the impedance buffer circuit 116 is configured to shift a phase by one hundred and eighty degrees of a signal received at each impedance buffer input port, e.g., invert a logic level of each of N digital data received from the transmitting circuitry 103, e.g., the first single ended signal bus 102. Thus, when a logic level is provided at each impedance input port, the logic level at each impedance input port is converted to an inverted logic level provided at a corresponding impedance output port. Optionally, when an inverting buffer circuit, the impedance buffer circuit 116 includes N sub-inverters, e.g., NOT gates when digital data is used, each of between a unique impedance buffer input port IC1, IC2, IC3 . . . and a corresponding unique impedance buffer output port II1, II2, II3 . . . of the impedance buffer circuit 116.

Figure 2:
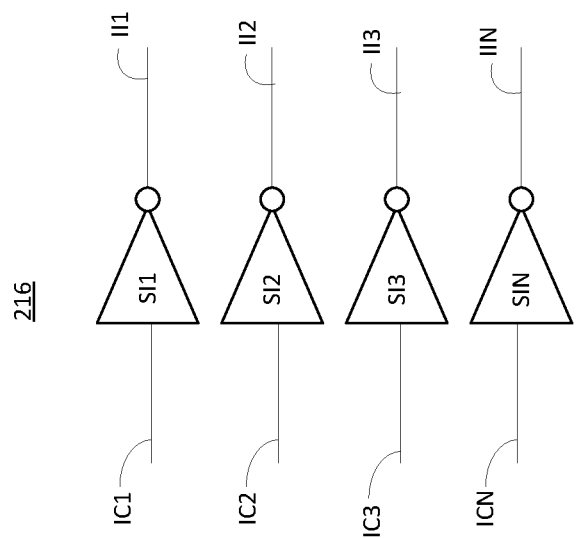
FIG. 2 illustrates one embodiment of a schematic diagram of an inverting impedance buffer circuit.

FIG. 2 illustrates one embodiment of a schematic diagram of the impedance buffer circuit 216 that is an inverting impedance buffer circuit. The illustrated inverting impedance buffer circuit comprises N sub-inverting impedance buffers (or sub-inverting impedance buffer circuits) SI1, SI2, SI3, SIN. Each sub-inverting impedance buffer circuit has an input port that is a corresponding one of the N input ports of the impedance buffer circuit 216. Each sub-inverting impedance buffer circuit has an output port that is a corresponding one of the N output ports of the impedance buffer circuit 216. Each sub-inverting impedance buffer circuit is configured to shift a phase by one hundred and eighty degrees of a signal received at its input port, e.g., invert a logic level of each of N digital data received from the transmitting circuitry 103, e.g., the first single ended signal bus 102.

Returning to FIG. 1, each transmission line of the optional second single ended signal bus 114 is electrically coupled, e.g., through a unique transmission line of the first single ended signal bus 102, to a unique transmitting circuitry output port to a unique inverter input port. To do so, each transmission line of the optional second single ended signal bus 114 is electrically coupled to a unique transmission line of the first single ended signal bus 102. For the embodiment illustrated in FIG. 1, a first electrical length EL1 between each electrical connection point between a pair of unique transmission lines T1a and T2a, T1b and T2b, T1c and T2c, T1N and T2N of the first and the optional second single ended signal busses and a transmitting circuitry output port O1, O2, O3, ON uniquely electrically coupled to such pair is less than a second electrical length EL2 between such connection point and a receiving circuitry input port I1, I2, I3, IN electrically coupled to such pair. Propagation delays through the first and the second electrical lengths EL1, EL2 and the impedance buffer circuit 116 can be greater than zero and the noise cancelation will still occur, but at reduced level.

The compensation impedance array 118 includes N compensation impedances Zc1, Zc2, Zc3, ZcN. The value of each nth compensation impedance is a function of the value of a corresponding nth input impedance. Thus, for example, the value of the compensation impedance Zc1 is a function of the first input impedance Zi1. Each compensation impedance Zc1, Zc2, Zc3, ZcN has one port electrically connected to a unique output II1, II2, II3 . . . of the impedance buffer circuit 116. Another port of each of the output impedances Zc1, Zc2, Zc3, ZcN is electrically connected to the inductor node ZNC and the receiving circuitry ground plane 109.

A change of voltage level at one or more of the input ports IC1, IC2, IC3, ICN, of the impedance buffer circuit 116 causes a corresponding compensation impedance(s) Zc1, Zc2, Zc3, ZcN to generate corresponding noise cancelling sub-current(s) at a corresponding output port(s) I11, 112, I13, IIN; the noise cancelling sub-current(s) are combined to form the noise cancelling current NCC. Such voltage level change(s) may arise due to a logic level change provided by the transmitting circuitry on one or more transmission lines T2a, T2b, T2c, T2N of the optional second single ended signal bus 114. The noise cancelling current NCC is conveyed through the node ZNC of the inductor 104 (with noise generating current NGC) through the inductor 104 to the transmitting circuitry ground plane 105. Thus, the common mode noise voltage NV across the inductor 104 is obtained by multiplying a rate of change of a sum of the noise generating current NGC and the noise cancelling current NCC, flowing through the inductor 104, by the inductance of the inductor 104.

Figure 3:
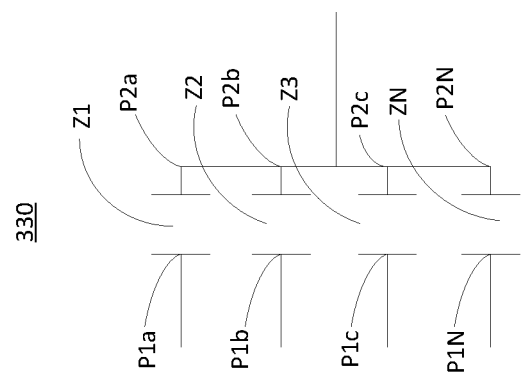
FIG. 3 illustrates a schematic diagram of an impedance array.

FIG. 3 illustrates a schematic diagram of an impedance array 330. The impedance array 330 is an exemplifies each of the input impedance array 113 and the compensation impedance array 118. The impedance array includes N impedances Z1, Z2, Z3, and ZN. Each of the N impedances Z1, Z2, Z3, ZN includes an input port P1a, P1b, P1c, P1N and an output port P2a, P2B, P2c, P2N. The output ports P2a, P2B, P2c, P2N are electrically connected to one another.

Returning to FIG. 1, to reduce the common noise voltage NV generated in the inductor, an amplitude (or magnitude) of a sum of the noise generating current NGC and the noise cancelling current NCC must be less than an amplitude of the noise generating current NGC. Optionally, spectral content of the noise cancelling current NCC must be substantially out of phase with spectral content of the noise generating current NGC, e.g., by an amount in a range between ninety degrees and two hundred and seventy degrees that includes one hundred and eighty degrees, and the amplitude of the spectral content of the noise cancelling current NCC must be in a range, e.g., between zero and twice the amplitude of the noise generating current. The technique illustrated above may be referred to as feedforward noise cancellation.

Optionally, a magnitude of the noise cancelling current NCC is substantially equal a magnitude of the noise generating current NGC, and a phase difference between the noise cancelling current NCC and the noise generating current NGC is substantially one hundred and eight degrees. Optionally, a magnitude of a sum of the noise cancelling current NCC and the noise generating current NGC is zero. Optionally, an impedance value of each compensation impedance Zc1, Zc2, Zc3, ZcN is substantially equal to an impedance of an input impedance Zi1. Zi2, Zi3, ZiN to which it is electrically connected through the first single ended signal bus 102, the optional second single ended signal bus 114, and the impedance buffer circuit 116[1]; this technique may be used to substantially diminish a sum of the noise cancelling current NCC and the noise generating current NGC, e.g., by substantially cancelling the noise generating current NGC with the noise cancelling current NCC.

[1] Optionally, each impedance of each of the input impedance array 113 is a capacitor, a capacitor in series with a resistor, or a capacitor in parallel with a resistor. Optionally, each impedance of each of the compensation impedance array 118 is a capacitor, a capacitor in series with a resistor, or a capacitor in parallel with a resistor.

Figure 4:
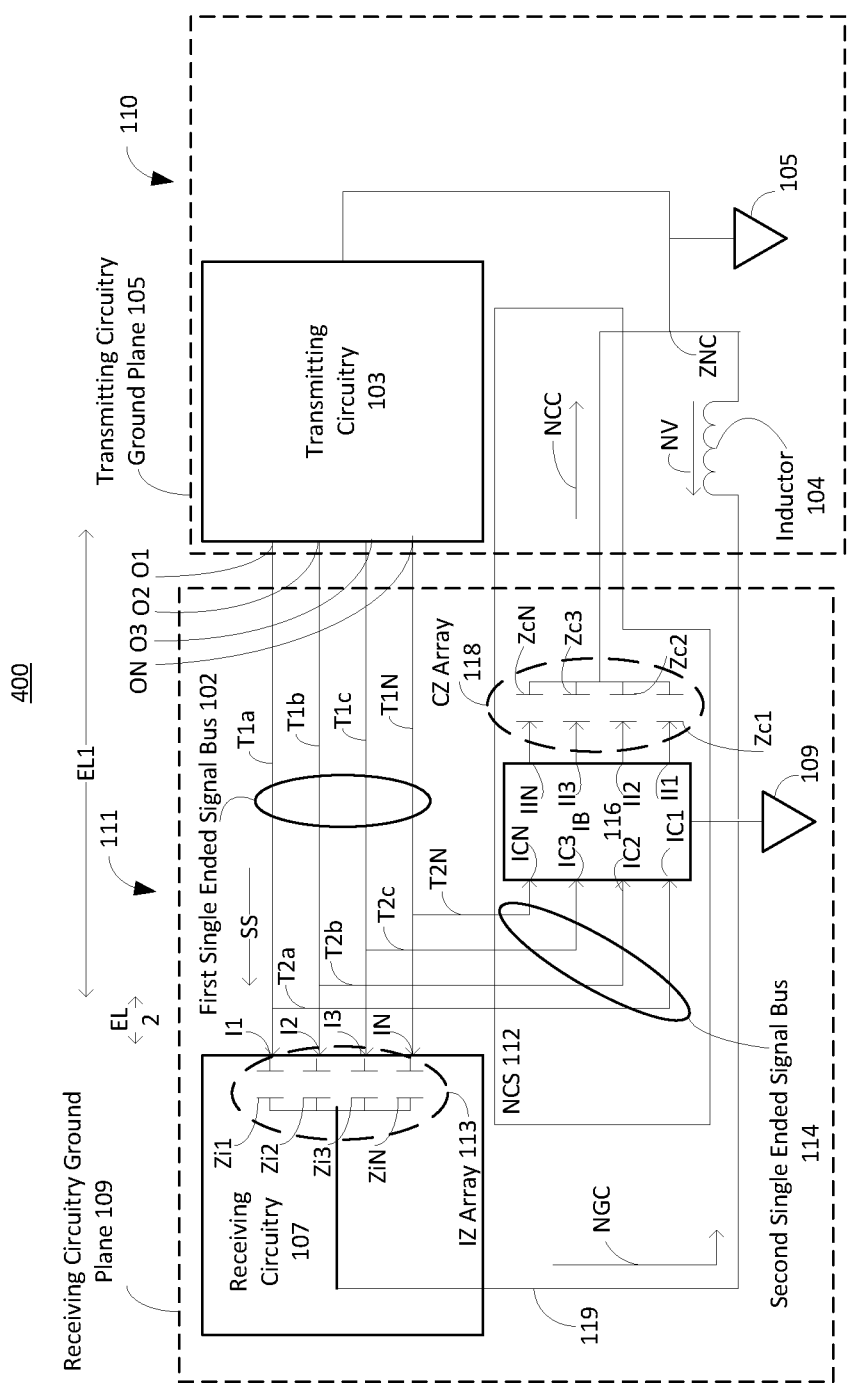
FIG. 4 illustrates a schematic diagram of one embodiment of a system, for reducing a common noise voltage when receiving at least one single ended signal, using a noise cancelling system whose ground is referenced with respect to a receiving circuitry ground plane.

FIG. 4 illustrates a schematic diagram of one embodiment of a system 400, for reducing a common noise voltage when receiving at least one single ended signal, using a noise cancelling system whose ground is referenced with respect to a receiving circuitry ground plane. The embodiment illustrated in FIG. 4 is the same as the embodiment illustrated in FIG. 1 except that (a) the receiving system 111, and not the transmitting system 110, includes the noise cancellation system 112, (b) the ground of the noise cancelling system is referenced with respect to the receiving circuitry ground plane, and (c) the impedance buffer circuit 116 is a non-inverting impedance buffer circuit[2], and optionally (d) the transmitting system 110, and not the receiving system 111, includes the inductance as exemplified by the inductor 104. In FIG. 4, the other port of each of the output impedances Zc1, Zc2, Zc3, ZcN is electrically connected to the inductor node ZNC and the transmitting circuitry ground plane 105 (rather than the receiving circuitry ground plane 109 as described with respect to FIG. 1.

[2] which has a non-inverting function.

A ground reference of the noise cancellation system 112 and the impedance buffer circuit 116 is the receiving circuitry ground plane 109. Optionally, the impedance buffer circuit 116 may be comprised of N non-inverting buffer circuits instead of the N inverter circuits SI1, SI2, SI3, SIN illustrated in FIG. 2. For pedagogical purposes, the transmitting system 110 is illustrated as including the inductor 104.

For the embodiment illustrated in FIG. 4, a first electrical length EL1 between each electrical connection point between a pair of unique transmission lines T1a and T2a, T1b and T2b, T1c and T2c, T1N and T2N of the first and the optional second single ended signal busses and a transmitting circuitry output port O1, O2, O3, ON uniquely electrically coupled to such pair is greater than a second electrical length EL2 between such connection point and a receiving circuitry input port I1, I2, I3, IN electrically coupled to such pair. The phase delay between when a signal is received by the input impedance array 113 and the compensation impedance array 118 is much larger for the embodiment illustrated in FIG. 4 in comparison to the embodiment illustrated in FIG. 1. Thus, the embodiment illustrated in FIG. 4 is unable to suppress the common node noise voltage NV to the extent the embodiment illustrated in FIG. 1 can do so. Optionally, the embodiments illustrated in FIGS. 1 and 4 may be combined.

Figure 5:
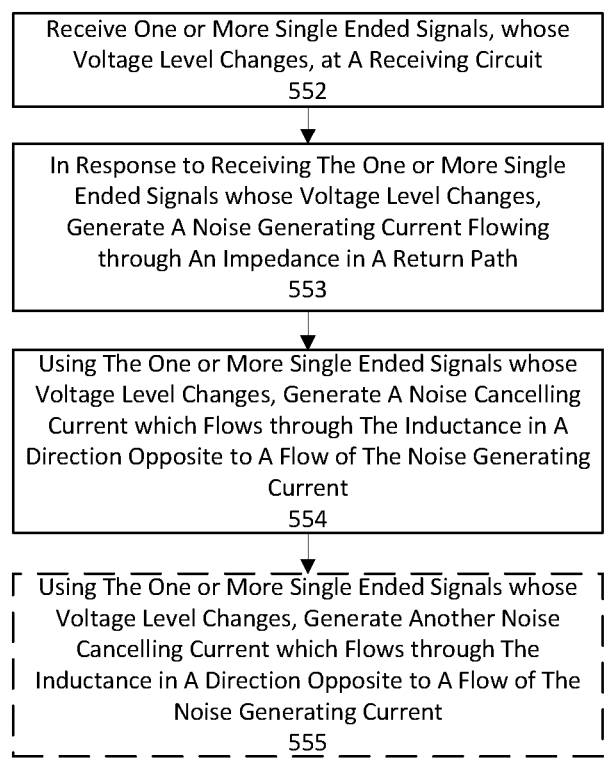
FIG. 5 illustrates a flow diagram of an exemplary method for reducing common mode noise voltage in an inductance of a return path when receiving one or more single ended signals.

FIG. 5 illustrates a flow diagram of an exemplary method 550 for reducing common mode noise voltage in an inductance of a return path when receiving one or more single ended signals. Method 550 facilitates generation of a noise cancelling current which diminishes noise generating current that causes common mode noise voltage in circuitry.

Exemplary method 550 may be implemented by one or more of the apparatuses illustrated in FIGS. 1-4. To the extent the methods herein are described herein as being implemented with one or more of the apparatuses illustrated in FIGS. 1-4, it is to be understood that other embodiments can be implemented in other ways. Techniques described with respect to the embodiments illustrated by FIGS. 1-4 may be applicable to the method 550.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 552, one or more single ended signals whose voltage level changes are received at a receiving circuitry from a transmitting circuitry, e.g., through transmission line(s) of a single ended signal bus at inputs of the receiving circuitry. Optionally, each single ended signal is an analog signal or a digital signal. If more than one single ended signal is received at the same time, then such single ended signals, e.g., bits of digital data, are received in parallel at the receiving circuitry data input. Optionally, a voltage level of at least one of the single ended signals, e.g., of one or more of the bits of data, changes at the same time. For example, for digital data, one or more of the bits of data transitions from a low logic state to a high logic state or vice versa.

In block 553, in response to receiving at least one single ended signal whose voltage level changes, a noise generating current is generated and which flows through an inductance in a return path from the receiving circuitry to the transmitting circuitry. Optionally, the return path includes the receiving circuitry ground plane and the transmitting circuitry ground plane. The noise generating current is an undesired current which when flowing through the inductance generates a common mode noise voltage across the inductance. Optionally, when a voltage, of more than one single ended signal, changes, e.g., at the same time, the noise generating current is generated by combining noise generating sub-currents each of which is generated in a corresponding input impedance of the receiving circuit and in response to a change of voltage level by a single ended signal across the corresponding input impedance. Optionally, a first node of each input impedance is electrically coupled to a unique transmission line of the single ended signal bus. Optionally, the single ended signal bus is electrically coupled respectively between the transmitting circuitry and the receiving circuitry. Optionally, each transmission line of the single ended signal bus is electrically coupled between a unique output port of the transmitting circuitry and a unique input port of the receiving circuitry.

In block 554, a noise cancelling current is generated using the one or more single ended signals whose voltage levels change. The noise cancelling current flows through the inductance in the return path in a direction which is opposite to a direction of flow of the noise generating current. Optionally, when a voltage, of more than one single ended signal, changes, e.g., at the same time, the noise generating current is generated by combining noise cancellation sub-currents each of which is generated in a corresponding impedance of a compensation impedance array and in response to a change of voltage level by a single ended signal across the corresponding impedance. Optionally, the one or more single ended signals whose voltage levels change is non-inverting impedance buffered or inverting impedance buffered prior to being provided to impedance(s) of the compensation impedance array (as described elsewhere herein).

In optional block 555, another noise cancelling current is generated using the one or more single ended signals whose voltage levels change. The noise cancelling current flows through the inductance in the return path in a direction which is opposite to the direction of flow of the noise generating current. Optionally, the noise cancelling current is generated by a first noise cancellation circuit whose ground reference is (a) a ground plane of a receiving circuit which is configured to receive the at least one single ended signal or (b) a ground plane of transmitting circuit configured to transmit the at least one single ended signal; optionally, the one or more single ended signals whose voltage levels change is non-inverting impedance buffered or inverting impedance buffered prior to being provided to impedance(s) of the compensation impedance array (as described elsewhere herein). Optionally, the other noise cancelling current is generated by a second noise cancellation circuit whose ground reference is respectively (a) a ground plane of transmitting circuit configured to transmit the at least one single ended signal or (b) a ground plane of a receiving circuit which is configured to receive the at least one single ended signal; optionally, the one or more single ended signals whose voltage levels change is respectively inverting impedance buffered or non-inverting impedance buffered prior to being provided to impedance(s) of the compensation impedance array (as described elsewhere herein).

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

Terms of relative position as used in this application are defined based on a plane parallel to the conventional plane or working surface of a material (e.g., a layer or a substrate), regardless of orientation. Terms such as "on," "higher," "lower," "over," "top," and "under" are defined with respect to the conventional plane or working surface being on the top surface of a layer or substrate, regardless of orientation. The terms "about" or "substantially" indicate that the value or parameter specified may be somewhat altered, as long as the alteration does not result in nonconformance of the process or structure to the illustrated embodiment. Finally, "exemplary" indicates the description is used as an example, rather than implying that it is an ideal. Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

EXAMPLE EMBODIMENTS

Example 1 includes a system for reducing a common noise voltage when receiving N single ended signals, the system comprising: a first noise cancellation circuit whose ground reference is configured to be (a) a ground plane of a receiving circuit comprising N receiving circuit input impedances each of which is configured to receive one of the N single ended signals or (b) a ground plane of a transmitting circuit configured to transmit the N single ended signals, wherein N is an integer greater than zero; and wherein the first noise cancellation circuit comprises N first compensation impedances each of which has a first port and a second port, wherein each second port is configured to be electrically connected to the ground plane of the receiving circuit or the transmitting circuit; wherein the first noise cancellation circuit further comprises a first impedance buffer circuit comprising (i) N first buffer inputs and (ii) N first buffer outputs each of which is electrically connected to the first port of one of the N first compensation impedances; wherein each first compensation impedance is configured to generate a first noise cancellation sub-current when a voltage of a single ended signal, received by a corresponding first buffer input, varies; wherein the first noise cancellation circuit is further configured to generate a first noise cancelling current which is a sum of first noise cancellation sub-currents and which flows through an inductance in a return path, between the transmitting circuit and the receiving circuit, in a direction opposite to a flow through the inductance of a noise generating current which flows through the return path from the receiving circuit to the transmitting circuit and which is formed by a sum of first noise generating sub-currents each of which is configured to be generated in one of the N receiving circuit input impedances when a voltage of a single ended signal received there at changes.

Example 2 includes the system of Example 1, further comprising a second noise cancellation circuit whose ground reference is configured to be respectively (a) the ground plane of the transmitting circuit configured to transmit the N single ended signals or (b) the ground plane of the receiving circuit; and wherein the second noise cancellation circuit comprises N second compensation impedances each of which has a third port and a fourth port, wherein each fourth port is configured to be electrically connected to the ground plane of respectively the transmitting circuit or the receiving circuit; wherein the second noise cancellation circuit further comprises a second impedance buffer circuit comprising (i) N second buffer inputs and (ii) N second buffer outputs each of which is electrically connected to the third port of one of the N second compensation impedances; wherein each second compensation impedance is configured to generate a second noise cancellation sub-current when a voltage of a single ended signal, received by a corresponding second buffer input, varies; wherein the second noise cancellation circuit is further configured to generate a second noise cancelling current which is a sum of N second noise cancellation sub-currents and which flows through the inductance in the return path in a direction opposite to the flow through the inductance of the noise generating current.

Example 3 includes the system of Example 2, wherein (a) the first impedance buffer circuit is an inverting impedance buffer circuit when each second port is configured to be electrically connected to the ground plane of the receiving circuit and the second impedance buffer circuit is a non-inverting impedance buffer circuit when each fourth port is configured to be electrically connected to the ground plane of the transmitting circuit or (b) the first impedance buffer circuit is the non-inverting impedance buffer circuit when each second port is configured to be electrically connected to the ground plane of the transmitting circuit and the second impedance buffer circuit is the inverting impedance buffer circuit when each second port is configured to be electrically connected to the ground plane of the receiving circuit.

Example 4 includes the system of any of Examples 1-3, wherein the first impedance buffer circuit comprises N impedance buffer circuits each of which is electrically connected between one of the N first buffer inputs and one of the N first buffer outputs.

Example 5 includes the system of any of Examples 1-4, wherein the first impedance buffer circuit is an inverting impedance buffer circuit when each second port is configured to be electrically connected to the ground plane of the receiving circuit.

Example 6 includes the system of Example 5, wherein the inverting impedance buffer circuit is part of the transmitting circuit.

Example 7 includes the system of any of Examples 1-6, wherein the first impedance buffer circuit is a non-inverting impedance buffer circuit when each second port is configured to be electrically connected to the ground plane of the transmitting circuit.

Example 8 includes the system of Example 7, wherein the non-inverting impedance buffer circuit is part of the receiving circuit.

Example 9 includes the system of any of Examples 1-8, wherein the inductance comprises an inductance of an inductor.

Example 10 includes the system of any of Examples 1-9, further comprising: the transmitting circuit; the receiving circuit; and a single ended bus communicatively coupling the transmitting circuit to the receiving circuit.

Example 11 includes the system of Example 10, wherein each of the N single ended signals is either an analog signal or a digital signal.

Example 12 includes a method for reducing a common noise voltage when receiving at least one single ended signal, the method comprising: receiving, at a receiving circuit whose ground reference is a ground plane of the receiving circuit, one or more single ended signals whose voltage level changes, from a transmitting circuit whose ground reference is a ground plane of the transmitting circuit; in response to receiving the one or more single ended signals whose voltage level changes, generating a noise generating current flowing from the receiving circuit to the transmitting circuit through an inductance in a return path from the receiving circuit to the transmitting circuit; and using the one or more single ended signals whose voltage level changes, generating a first noise cancelling current flowing through the inductance in the return path in a direction opposite to a flow of the noise generating current through the inductance.

Example 13 includes the method of Example 12, further comprising, using the one or more single ended signals whose voltage level changes, generating a second noise cancelling current flowing through the inductance in the return path in a direction opposite to a flow of the noise generating current through the inductance; and wherein the first noise cancelling current is generated by a first noise cancellation circuit configured to provide the first noise cancelling current to (a) the ground plane of the receiving circuit which is configured to receive the at least one single ended signal or (b) the ground plane of the transmitting circuit configured to transmit the at least one single ended signal; wherein the second noise cancelling current is generated by a second noise cancellation circuit configured to provide the second noise cancelling current to respectively (a) the ground plane of the transmitting circuit configured to transmit the at least one single ended signal or (b) the ground plane of the receiving circuit which is configured to receive the at least one single ended signal.

Example 14 includes the method of any of Examples 12-13, wherein each of the at least one single ended signal is an analog signal or a digital signal.

Example 15 includes the method of any of Examples 12-14, wherein the inductance comprises an inductance of an inductor.

Example 16 includes the method of any of Examples 12-15, wherein the noise generating current is a sum of one or more noise generating sub-currents, wherein each noise generating sub-current is generated by an impedance of an input of the receiving circuit which receives a single ended signal whose voltage level changes.

Example 15 includes the method of any of Examples 12-16, wherein the first noise cancelling current is a sum of one or more noise cancelling sub-currents, wherein each noise cancelling sub-current is generated by a compensation impedance.

Example 18 includes an apparatus for reducing common mode noise in single ended digital data, the apparatus comprising: an inverter circuit configured to receive N single ended signals transmitted to N input impedances of receiving circuitry, wherein N is an integer greater than zero; and N compensation impedances, wherein a first port of each of the N compensation impedances is electrically coupled to a unique output port of the inverter circuit, and wherein a second port of each of the N compensation impedances is electrically connected to all other second ports of other compensation impedances and to a first or a second ground plane; wherein the inverter circuit is configured to invert a single ended signal received at each input port of the inverter circuit to provide each single ended signal which has been inverted to a unique compensation impedance of the N compensation impedances; wherein in response to receiving each single ended signal which has been inverted, the N compensation impedances are configured to generate a noise cancelling current which is summed with a noise generating current, generated in the N input impedances of the receiving circuitry, to form a sum current which flows through an inductance in a return path electrically coupling the first and the second ground planes and whose magnitude is less than a magnitude of the noise generating current.

Example 19 includes the apparatus of Example 18, further comprising: transmitting circuitry configured to transmit the N single ended signals and whose ground is referenced with respect to the first ground plane; the first ground plane electrically connected to the transmitting circuitry; the receiving circuitry electrically comprising the N input impedances and whose ground is referenced with respect to the second ground plane; and the second ground plane electrically connected to the receiving circuitry.

Example 20 includes the apparatus of any of Examples 18-19, wherein a value of each input impedance and each compensation impedance, which are electrically coupled through a unique transmission line, are equal.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system for reducing a common noise voltage when receiving N single ended signals, the system comprising:
   a first noise cancellation circuit whose ground reference is configured to be (a) a ground plane of a receiving circuit comprising N receiving circuit input impedances each of which is configured to receive one of the N single ended signals or (b) a ground plane of a transmitting circuit configured to transmit the N single ended signals, wherein N is an integer greater than zero; and
   wherein the first noise cancellation circuit comprises N first compensation impedances each of which has a first port and a second port, wherein each second port is configured to be electrically connected to the ground plane of the receiving circuit or the transmitting circuit;
   wherein the first noise cancellation circuit further comprises a first impedance buffer circuit comprising (i) N first buffer inputs and (ii) N first buffer outputs each of which is electrically connected to the first port of one of the N first compensation impedances;
   wherein each first compensation impedance is configured to generate a first noise cancellation sub-current when a voltage of a single ended signal, received by a corresponding first buffer input, varies;
   wherein the first noise cancellation circuit is further configured to generate a first noise cancelling current which is a sum of first noise cancellation sub-currents and which flows through an inductance in a return path, between the transmitting circuit and the receiving circuit, in a direction opposite to a flow through the inductance of a noise generating current which flows through the return path from the receiving circuit to the transmitting circuit and which is formed by a sum of first noise generating sub-currents each of which is configured to be generated in one of the N receiving circuit input impedances when a voltage of a single ended signal received there at changes.

2. The system of claim 1, further comprising a second noise cancellation circuit whose ground reference is configured to be respectively (a) the ground plane of the transmitting circuit configured to transmit the N single ended signals or (b) the ground plane of the receiving circuit; and
   wherein the second noise cancellation circuit comprises N second compensation impedances each of which has a third port and a fourth port, wherein each fourth port is configured to be electrically connected to the ground plane of respectively the transmitting circuit or the receiving circuit;
   wherein the second noise cancellation circuit further comprises a second impedance buffer circuit comprising (i) N second buffer inputs and (ii) N second buffer outputs each of which is electrically connected to the third port of one of the N second compensation impedances;
   wherein each second compensation impedance is configured to generate a second noise cancellation sub-current when a voltage of a single ended signal, received by a corresponding second buffer input, varies;
   wherein the second noise cancellation circuit is further configured to generate a second noise cancelling current which is a sum of N second noise cancellation sub-currents and which flows through the inductance in the return path in a direction opposite to the flow through the inductance of the noise generating current.

3. The system of claim 2, wherein (a) the first impedance buffer circuit is an inverting impedance buffer circuit when each second port is configured to be electrically connected to the ground plane of the receiving circuit and the second impedance buffer circuit is a non-inverting impedance buffer circuit when each fourth port is configured to be electrically connected to the ground plane of the transmitting circuit or (b) the first impedance buffer circuit is the non-inverting impedance buffer circuit when each second port is configured to be electrically connected to the ground plane of the transmitting circuit and the second impedance buffer circuit is the inverting impedance buffer circuit when each second port is configured to be electrically connected to the ground plane of the receiving circuit.

4. The system of claim 1, wherein the first impedance buffer circuit comprises N impedance buffer circuits each of which is electrically connected between one of the N first buffer inputs and one of the N first buffer outputs.

5. The system of claim 1, wherein the first impedance buffer circuit is an inverting impedance buffer circuit when each second port is configured to be electrically connected to the ground plane of the receiving circuit.

6. The system of claim 5, wherein the inverting impedance buffer circuit is part of the transmitting circuit.

7. The system of claim 1, wherein the first impedance buffer circuit is a non-inverting impedance buffer circuit when each second port is configured to be electrically connected to the ground plane of the transmitting circuit.

8. The system of claim 7, wherein the non-inverting impedance buffer circuit is part of the receiving circuit.

9. The system of claim 1, wherein the inductance comprises an inductance of an inductor.

10. The system of claim 1, further comprising:
the transmitting circuit;
the receiving circuit; and
a single ended bus communicatively coupling the transmitting circuit to the receiving circuit.

11. The system of claim 10, wherein each of the N single ended signals is either an analog signal or a digital signal.

12. A method for reducing a common noise voltage when receiving at least one single ended signal, the method comprising:
receiving, at a receiving circuit whose ground reference is a ground plane of the receiving circuit, one or more single ended signals whose voltage level changes, from a transmitting circuit whose ground reference is a ground plane of the transmitting circuit;
in response to receiving the one or more single ended signals whose voltage level changes, generating a noise generating current flowing from the receiving circuit to the transmitting circuit through an inductance in a return path from the receiving circuit to the transmitting circuit; and
using the one or more single ended signals whose voltage level changes, generating a first noise cancelling current flowing through the inductance in the return path in a direction opposite to a flow of the noise generating current through the inductance.

13. The method of claim 12, further comprising, using the one or more single ended signals whose voltage level changes, generating a second noise cancelling current flowing through the inductance in the return path in a direction opposite to a flow of the noise generating current through the inductance; and
wherein the first noise cancelling current is generated by a first noise cancellation circuit configured to provide the first noise cancelling current to (a) the ground plane of the receiving circuit which is configured to receive the at least one single ended signal or (b) the ground plane of the transmitting circuit configured to transmit the at least one single ended signal;
wherein the second noise cancelling current is generated by a second noise cancellation circuit configured to provide the second noise cancelling current to respectively (a) the ground plane of the transmitting circuit configured to transmit the at least one single ended signal or (b) the ground plane of the receiving circuit which is configured to receive the at least one single ended signal.

14. The method of claim 12, wherein each of the at least one single ended signal is an analog signal or a digital signal.

15. The method of claim 12, wherein the inductance comprises an inductance of an inductor.

16. The method of claim 12, wherein the noise generating current is a sum of one or more noise generating sub-currents, wherein each noise generating sub-current is generated by an impedance of an input of the receiving circuit which receives a single ended signal whose voltage level changes.

17. The method of claim 12, wherein the first noise cancelling current is a sum of one or more noise cancelling sub-currents, wherein each noise cancelling sub-current is generated by a compensation impedance.

18. An apparatus for reducing common mode noise in single ended digital data, the apparatus comprising:
an inverter circuit configured to receive N single ended signals transmitted to N input impedances of receiving circuitry, wherein N is an integer greater than zero; and
N compensation impedances, wherein a first port of each of the N compensation impedances is electrically coupled to a unique output port of the inverter circuit, and wherein a second port of each of the N compensation impedances is electrically connected to all other second ports of other compensation impedances and to a first or a second ground plane;
wherein the inverter circuit is configured to invert a single ended signal received at each input port of the inverter circuit to provide each single ended signal which has been inverted to a unique compensation impedance of the N compensation impedances;
wherein in response to receiving each single ended signal which has been inverted, the N compensation impedances are configured to generate a noise cancelling current which is summed with a noise generating current, generated in the N input impedances of the receiving circuitry, to form a sum current which flows through an inductance in a return path electrically coupling the first and the second ground planes and whose magnitude is less than a magnitude of the noise generating current.

19. The apparatus of claim 18, further comprising:
transmitting circuitry configured to transmit the N single ended signals and whose ground is referenced with respect to the first ground plane;
the first ground plane electrically connected to the transmitting circuitry;
the receiving circuitry electrically comprising the N input impedances and whose ground is referenced with respect to the second ground plane; and
the second ground plane electrically connected to the receiving circuitry.

20. The apparatus of claim 18, wherein a value of each input impedance and each compensation impedance, which are electrically coupled through a unique transmission line, are equal.

* * * * *